(12) United States Patent
Nyffenegger

(10) Patent No.: US 8,338,974 B2
(45) Date of Patent: Dec. 25, 2012

(54) WIND TURBINE

(75) Inventor: Johannes F. Nyffenegger, Laguna Niguel, CA (US)

(73) Assignee: AGlobal Tech, LLC, Las Vegas, NV (US)

(*) Notice: Subject to any disclaimer, the term of this patent is extended or adjusted under 35 U.S.C. 154(b) by 446 days.

(21) Appl. No.: 12/559,309

(22) Filed: Sep. 14, 2009

(65) Prior Publication Data

US 2010/0207389 A1 Aug. 19, 2010

Related U.S. Application Data

(60) Provisional application No. 61/096,325, filed on Sep. 12, 2008.

(51) Int. Cl.
*F03D 9/00* (2006.01)
*H02P 9/04* (2006.01)

(52) U.S. Cl. ......................................................... 290/44

(58) Field of Classification Search ..................... 290/43, 290/44, 52, 54, 55; 415/4.2, 2.1; 416/132 B
See application file for complete search history.

(56) References Cited

U.S. PATENT DOCUMENTS 6,011,334 A * 1/2000 Roland ........................... 310/86
7,471,009 B2 * 12/2008 Davis et al. ..................... 290/54

* cited by examiner

*Primary Examiner* — Javaid Nasri

(57) ABSTRACT

A wind turbine for generating an electric voltage from mechanical energy derived from wind is provided. The invention includes a specially designed turbine enclosure through which the wind passes. The enclosure has a Venturi area which results in movement of the wind at a rapid speed through the turbine. An electric generator with a rotable blade also is provided within the Venturi area in order to take advantage of the faster moving wind. The faster the wind moves, the more energy can be converted by the generator. The generator can be constructed with a plurality of electric coils and magnets which can be arranged in series/parallel combinations depending on the power requirements of a particular application.

19 Claims, 14 Drawing Sheets

Prior Art

Electric Double Layer Capacitor & associated switching logic, parallel terminal converter unit.

WIND TURBINE

CROSS-REFERENCE TO RELATED APPLICATION

This application claims priority to provisional patent application Ser. No. 61/096,325 filed on Sep. 12, 2008 and entitled "Micro Wind Turbine Generator Module", the contents of which are incorporated herein by reference.

BACKGROUND OF THE INVENTION

The present invention generally relates to the field of energy conversion and more particularly, is directed to a method and apparatus for efficient and practical conversion of mechanical energy into electrical energy. Conversion of mechanical into electrical energy has many applications from electronic measurements and analysis to power generation. The present invention greatly advances society's goal of using all forms of energy sources, especially renewable sources, to meet the energy needs of mankind.

While a preferred embodiment of the present invention will be described with reference to mechanical energy derived from wind, the invention has application to many sources of energy where the energy is in the form of a moving fluid or a fluid that is stationary and impedes movement.

As used herein, the term "fluid" includes such substances as air, liquids and gases. The phrase "energy conversion" and similar terms are used herein in accordance with the well known law of conservation of energy. In summary, this law states that the total amount of energy in an isolated system remains constant. Thus, energy can not be created or destroyed, but can only be changed, i.e., converted, from one form into another.

Wind turbines are well known in the prior art as a way to convert wind energy into mechanical energy and then to convert the mechanical energy into electrical energy. Conventional wind turbines typically come in two types based on the axis in which the turbine rotates.

Horizontal axis wind turbines include a main rotor shaft, a gear box, an electrical generator of some type and in many cases, a solid state power converter. The turbine is mounted on top of a tall tower with the main rotor shaft pointed into the wind. Small horizontal axis wind turbines are pointed by a simple wind vane, while the pointing of large turbines typically is performed by a wind direction sensor coupled to a closed loop controlled servo drive motor.

Almost all horizontal axis wind turbines are equipped with three rotor blades. The individual rotor blade lengths may range from 65 to 130 ft or more and rotate from 10 to 25 rpm. As known in the prior art, this rather complex and relatively heavy equipment package usually is installed on top of tubular towers ranging in height from 150 to 300 feet.

Modern wind turbines also are equipped with a high wind shut down feature, or governor, to prevent catastrophic damage due to unexpectedly high wind velocities. The wind shut down velocity typically is between 25 and 30 meters per second (approximately 56 to 67 miles per hour).

The technical problems associated with horizontal axis wind turbines include, but are not limited to:
a) Horizontal axis wind turbines cannot efficiently operate in turbulent wind conditions encountered close to the ground. Horizontal turbines require laminar wind conditions to operate efficiently;
b) The typically large dimensions of tall towers and associated blades are difficult and expensive to handle and transport. The transportation and handling costs can range between 30% to 40% of basic hardware cost, depending on the topography of the installation site;
c) Tall horizontal wind turbines are extremely expensive to install, particularly in topographically challenging and remote terrains;
d) Massive tower foundation construction is required to support tall horizontal wind turbine structures;
e) Maintenance of tall horizontal wind turbines is very expensive as evident from an entirely new industry that has developed to exploit these high cost;
f) Tall horizontal wind turbines directly and detrimentally affect military and commercial air traffic control and safety based on their interference with radar technology;
g) Environmental groups oppose horizontal wind turbines due to their adverse and detrimental impact on the population and migration of birds;
h) Tall horizontal wind turbines are obtrusively visible across large areas, disrupting the appearance of the landscape and in numerous cases causing local opposition to their construction;
i) Downwind variants of horizontal wind turbines are susceptible to fatigue and structural failure due to turbulence; and
j) Cyclic stresses, fatigue and vibration are a major cause of failure of horizontal axis wind turbines. That is the reason why 15% or more of them may be out of service at any one time in major installations.

Vertical axis wind turbines rotate on a vertical rotor shaft and are less commonly used for various reasons. The technical problems associated with vertical axis wind turbines typically include, but are not limited to, the following:
a) A vertical axis wind turbine is about 50% less efficient than a horizontal wind turbine due to higher blade drag while rotating in the wind;
b) As vertical axis turbines can not be packaged and installed on towers, they are not able to take advantage of stronger, more laminar, wind conditions at higher elevations;
c) Like their horizontal axis counterparts, vertical axis turbines cannot efficiently operate in turbulent wind conditions typically encountered near the ground. They require laminar wind conditions to operate efficiently;
d) Some vertical axis wind turbines have a high starting torque and require auxiliary energy sources to get started; and
e) Some vertical axis wind turbines require guy cables to hold them in place. These guy cables add additional load to the bottom bearing of the turbine. This is particularly so in the event of strong wind gusts as the bearing absorbs the total weight of the turbine rotor. Superstructures may be required to support and hold the top bearing in place.

In many regions of the world, wind is readily available and in abundant supply. The fact that wind is eco-friendly, and renewable, makes it an ideal energy source. Thus, while wind turbines have their limitations as described above, they remain an important way of converting mechanical energy into electrical energy. However, wind turbines have further limitations imposed by the laws of physics that can not be easily overcome.

For example, Betz's law states that the maximum power P that can be extracted by any wind turbine from the free flow of wind is given by the following equation.

$$P = \frac{1}{2} \alpha \rho \pi r^2 v^3$$

Where:
P=Power (watts);

α=Efficiency factor based on the design of the wind turbine as defined by Betz's law;
ρ=Mass density of air (kg/m³);
r=Radius of the wind turbine blade path (m); and
v=Velocity of the wind (m/s);

Betz's law states that the efficiency factor α can not exceed 0.59 regardless of the type and design of the wind turbine. Thus, a typical horizontal wind turbine with a turbine blade radius of r=0.02125 m, and a very conservative Betz factor of α=0.17, is potentially capable of producing 12 watts at a wind velocity of 43 m/s or 96 mph, assuming a mass density of air at sea level of ρ=1.225 kg/m³.

Thus, the number and severity of the above noted limitations and deficiencies of traditional wind turbines make their use less than ideal in many situations. Moreover, the use of traditional wind turbines is completely unsuited for some applications. Thus, other forms of energy conversion are known in the prior art.

Examples of alternative forms of energy conversion include (1) batteries, where energy stored in chemical form is converted into electrical energy through a chemical reaction; (2) fuel cells, where a chemical reaction between hydrogen and oxygen atoms is converted into electrical energy; (3) electric generators where mechanical energy in the form of a prime mover is converted into electrical energy; and (4) solar energy where radiant light from the sun is converted into electrical energy.

While each of these alternative forms of energy conversion has advantages in particular applications, they also have disadvantages in other applications. The advantages have chiefly to do with their ability to used the energy source at hand for conversion into electrical energy. The disadvantages have chiefly to do with the amount of energy that can be converted, physical size and cost considerations.

While batteries can be made small in size and at low cost, they are limited in the amount of electrical energy that can be converted from their chemical reaction. Depending on their design, fuel cells can operate at higher sustained energy levels and for longer periods of time than batteries but are very expensive to manufacture. Prior art electric generators can be designed to operate at high energy levels but also are expensive, physically large in size and required a largest amount of source energy. Prior art approaches to solar energy conversion suffer from low conversion efficiency and, in many cases, the lack of a continuous supply of solar energy.

Thus, there remains a need in the art for a method and apparatus for converting mechanical energy into electrical energy which addresses the above noted disadvantages and deficiencies associated with conventional energy conversion methods and apparatuses.

SUMMARY OF THE INVENTION

The present invention addresses the efficient transformation of mechanical energy into electrical energy, reducing or completely eliminating the technical problems experienced by conventional conversion devices, such as wind turbines as identified above.

The inventor has discovered that the most efficient and effective way to generate electrical energy is to utilize a naturally occurring input energy source such as wind, water or other fluid. The advantage of this approach is that the input energy source usually is available at little or no cost, is renewable, and has no adverse effect on the environment. Thus, the inventor has developed a novel energy conversion device in the form of a turbine which efficiently converts mechanical energy from a fluid source, such as air and water, into electrical energy.

While the present invention has many novel features, one such feature is that the turbine can be made large or small depending on the availability of input energy and output energy requirements. A plurality of small modularized turbines in accordance with the present invention may be combined to achieve required output energy requirements.

An objective of the present invention is to provide a very small, but highly efficient, compact, powerful, precise, easy to maintain and very reliable micro turbine to:

a) Efficiently convert wind energy, and energy derived from other fluids, into mechanical energy applying Bernoulli's principle coupled with Betz' law;

b) Apply Faraday's law of induction, including Lenz' law, in a novel way, to efficiently convert mechanical energy into electrical energy;

c) Combine any number of the micro turbines into easily assembled, highly modular, very manageable modules producing amounts of electrical energy comparable with the electrical energy produced by unwieldy conventional big wind turbines;

d) Convert the electrical energy produced by these modules for direct interface and delivery of electrical energy to the existing, conventional power grid;

e) Store the electrical energy in conventional battery arrangements for certain applications;

f) Store the electrical energy in Electric Double-Layer Capacitor (EDLC) arrangements for certain other applications; and g) Store the electrical energy in Superconducting Magnetic Energy Storage (SMES) arrangements.

The invention proposes a novel micro wind turbine with the following design features and specifications:

a) Basic unidirectional or bidirectional micro turbine design optimizing Bernoulli's principle, including a fixed axle mechanically suspended at the center of the turbine. The gearbox and electric generator, conventionally driven by the axle and located in the center of the venture area, are eliminated and removed, thus considerably increasing the efficiency of the turbine.

(b) One or n turbine fan stages are installed, and rotate freely on the fixed axle. Each fan stage has n blades configured at a fixed pitch angle, which is optimized to achieve maximum rotational speed, corresponding with the wind velocity in the turbine Venturi area. The fixed pitch angle in multistage micro turbines change alternatively, forcing the stream of wind to change direction at each stage, thus extracting more power and increasing the efficiency of the micro wind turbine.

c) Each blade tip of the turbine fan stage(s) is equipped with a permanent magnet featuring an optimized permanent magnetic field using neodymium (rare earth) magnets, or equivalent.

d) Installed on the outside circumference of the turbine, perfectly aligned with the rotational path of the permanent magnets installed on the blade tips of the turbine fan stages, are n electrical coils or poles, each with n windings. Every time a permanent magnet passes one of these poles, electrical energy in terms of a DC voltage is generated in the coil, as defined in Faraday's law of induction. The ferrite core of the coils are laminated to prevent the generation Eddy currents, which detrimentally affect the efficiency of the electric generator.

e) The poles, or coils, can be electrically connected in series, parallel, or any combination of serial and parallel, in order to achieve the desired output voltage.

f) The target power output of the micro wind turbine is 10 Watts at a rated turbine intake wind velocity of 12 m/s, increasing exponentially with increasing intake wind speed.

g) The micro turbine rated under f above is unidirectional, and the directional adjustment of a module comprised of unidirectional micro wind turbines by servo controlled directional adjustment is optional.

h) A bidirectional micro wind turbine is optional. Bidirectional micro wind turbines are expected to produce slightly more power than a unidirectional unit at with a rated turbine intake wind velocity of 12 m/s.

i) The physical size of the basic unidirectional micro wind turbine is targeted at approximately 10 cm×10 cm×10 cm. The design is highly modular with integrated, quick disconnect, self locking, aerospace type electrical connection pins and corresponding sockets. There is no requirement for cabling harnesses in the assembly of modules.

j) The physical size of the bidirectional micro wind turbine is targeted at approximately 10 cm×10 cm×20 cm. The design is highly modular with integrated, quick disconnect, self locking, aerospace type electrical connection pins and corresponding sockets. There is no requirement for cabling harnesses in the assembly of modules.

k) Target module size for cascaded installation is 100 cm×100 cm, or 1 m$^2$, in any suitable electrical configuration, containing 100 micro wind turbines, with a rated module power output of 100×12 Watts, or 1.2 kW per module, at a rated wind velocity of 12 m/s. Packaging of the micro wind turbines is extremely compact and dense resulting in highly compact module assemblies in practically any geometric shape, such as rectangular, circular or any suitable irregular shape can easily be assembled due to the modular design of the micro wind turbine.

l) In laminar or transitional wind conditions, optimal efficiency is obtained by installing the micro wind turbine modules linearly cascaded.

m) In order to obtain maximum efficiency in consistent turbulent wind conditions, alternating cascaded linear module installation is recommended.

n) Micro wind turbines feature integrated diagnostic LED displays for ease of maintenance and troubleshooting.

o) Micro wind turbines do not require over-speed control, or governors, since they are precision machines featuring relatively little mass, using precisely balanced turbine fan stages, and high reliability, analog precision watch bearings.

p) Construction of the micro wind turbines is environmentally friendly, highly modular and functional, possibly using high impact, injection molded clear plastic materials with steel reinforcements, where required. The prime objective is to blend in with the surrounding environment, i.e. the modules are very difficult to see.

q) Potential installation of the cascaded and shaped modules may be directly on the ground, or slightly elevated, in and along small canyons, rock formations, cliffs, on the side of tall buildings, bridges, dams, on top of bill boards, fences, on moving objects such as trains, trucks, cars, military vehicles, antennas, etc.

r) Maintenance of cascaded modules is simple, as individual micro wind turbine units can easily be replaced due to the highly modular design.

s) Any cascaded module continues to generate electrical power in the event of single, or multiple micro wind turbine unit failure.

t) Installations of cascaded modules pose no danger to birds due to the small size of the individual micro wind turbines.

u) Installations of cascaded modules do not interfere with radar operations near commercial and military airports.

v) Installations of cascaded modules can be cleaned easily by hosing them down with environmentally friendly cleaning solutions.

w) An anti-icing pulsating heating option for the proposed micro wind turbine will be available for applications in severe cold environments.

The novel features of the present invention are set out with particularity in the following detailed description of the preferred embodiment. However, the invention will be understood more fully and clearly from the detailed description of the invention as set forth in the accompanying drawings in which:

DESCRIPTION OF THE PREFERRED EMBODIMENT

Figure 1:
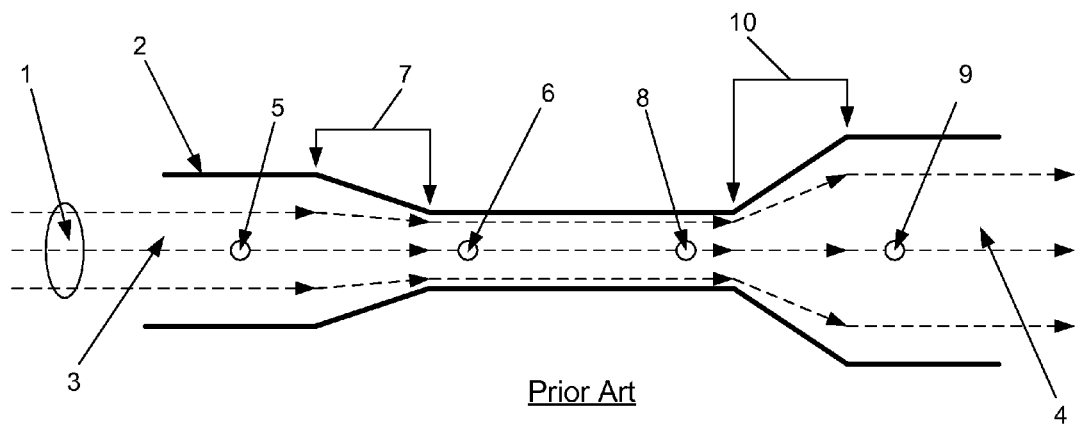
FIGS. 1 and 2 are cross-sectional views of an enclosure with a Venturi area illustrating the Venturi effect with respect to a flowing fluid.

The present invention takes advantage of a number of well known principles in the fields of fluid dynamics and magnetism. Bernoulli's law is one such principle. Bernoulli states that an increase in speed of a fluid in a closed environment simultaneously results in a decrease in pressure in the fluid's potential energy. FIG. 1 illustrates this principle for a fluid 1 moving through an enclosure 2. Enclosure 2 has an inlet 3 and an outlet 4.

Assuming that fluid 1 is not compressible and the walls of enclosure 2 are not expandable; the volume of fluid leaving the enclosure through outlet 4 must equal the volume entering the enclosure through inlet 3. Thus, the sum of the kinetic and potential energy of fluid 1 remains constant throughout enclosure 2. For this to be the case, the pressure and flow speed of fluid 1 will be different at different locations within enclosure 2 in accordance with Bernoulli's law.

For example, fluid pressure at location 5 in FIG. 1 will be lower than fluid pressure at location 6 due to the passage way reduction in area 7. This pressure reduction is known as the Venturi effect and is explained by the conservation of energy principle. Correspondingly, fluid flow speed at location 6 will be higher than fluid flow speed at location 5 in order to satisfy the equation of continuity.

A correspondingly, a change in fluid pressure and speed between locations 8 and 9 will occur as a result of the Venturi effect caused by the passage way enlargement in area 10. Fluid pressure and speed at location 8 will be higher than fluid pressure and speed at location 9.

With again the Betz power equation for a wind turbine, as restated below:

$$P = \tfrac{1}{2} a \rho \pi r^2 v^3$$

In order to maximize power of a wind turbine, note again that a (efficiency) is fixed at 0.59 percent and can not be changed, $\rho$ (mass density of air) is fixed and can not be changed, and v (wind velocity) is not considered by the prior art to be changeable from its naturally occurring speed. Thus, the only term in the Betz equation that is readily subject to change by man for the purpose of increasing the power of a wind turbine is r (the radius of the wind turbine blade).

However, there are practical limits to the physical size of a turbine blade. Considerations of weight, cost, and disruption to the aesthetic appeal of the property on which the turbine is mounted all conspire against turbine designs with large blades. These limitations are fully addressed by the present invention.

In accordance with the present invention, a turbine for converting mechanical energy into electrical energy is disclosed which includes among it unique features, the ability to increase the velocity of the media which is used to turn the turbine blade, i.e., wind. As can be seen from Betz's power equation, increasing media velocity ("v") has a much larger impact on power output than a corresponding percentage increase in size of the turbine's rotator ("r"). The "v" term in Betz's equation is cubed, i.e., multiplied by three, while the "r" term is squared, i.e., multiplied by two. Thus, an increase in media velocity has more effect than the same percentage increase in rotor size.

The present invention provides not only a novel approach to increasing media velocity inside the turbine, but also offers a much improved method and apparatus for conversion of mechanical energy derived from the input media into electrical energy than prior art solutions. The increased media velocity and novel approach to energy conversion results in a substantial increase in electrical power generation per unit size of the turbine than previously known in the art. While blade size remains an important factor in the amount of power generation, the heretofore inability to change another important factor, media (e.g., wind) velocity, has been eliminated in the present invention.

The turbine of the present invention not only has application to converting mechanical energy in the form of wind to electrical energy, but may also be used with most other fluids such as air, water and gases.

Figure 2:
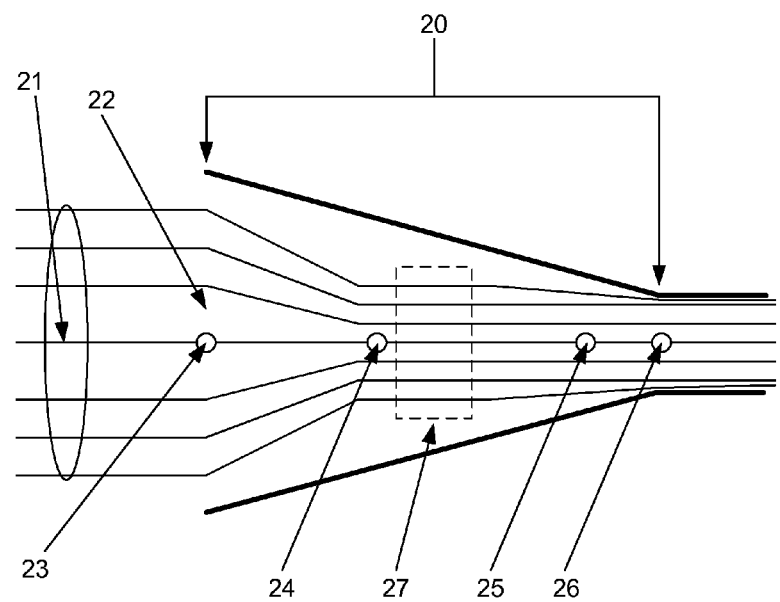

FIG. 2 is a simplified cross-sectional view of a turbine in accordance with the present invention. The constituent internal components of the turbine are mounted within an enclosure having a Venturi area 20 similar to area 7 in FIG. 1. Thus, fluid 21, such as wind or water, enters inlet 22 of Venturi area 20 at a speed X at location 23 in FIG. 2. Due to the Venturi effect, the fluid increases to speed X+ at location 24 and to X++ at location 25. The speed further increases to X+++ at location 26.

Reference number 27 denotes an electric generator which converts the mechanical energy of the fluid to electrical energy. As will be discussed in more detail below, the generator includes a rotating blade which is driven by fluid 21 in order to turn the generator. The rotating speed of the blade is proportional to the speed of fluid 21 which is in turn proportional to the amount of mechanical energy available for conversion to electrical energy. Thus, the faster the blade rotates, the more electrical energy can be generated.

Figure 3:
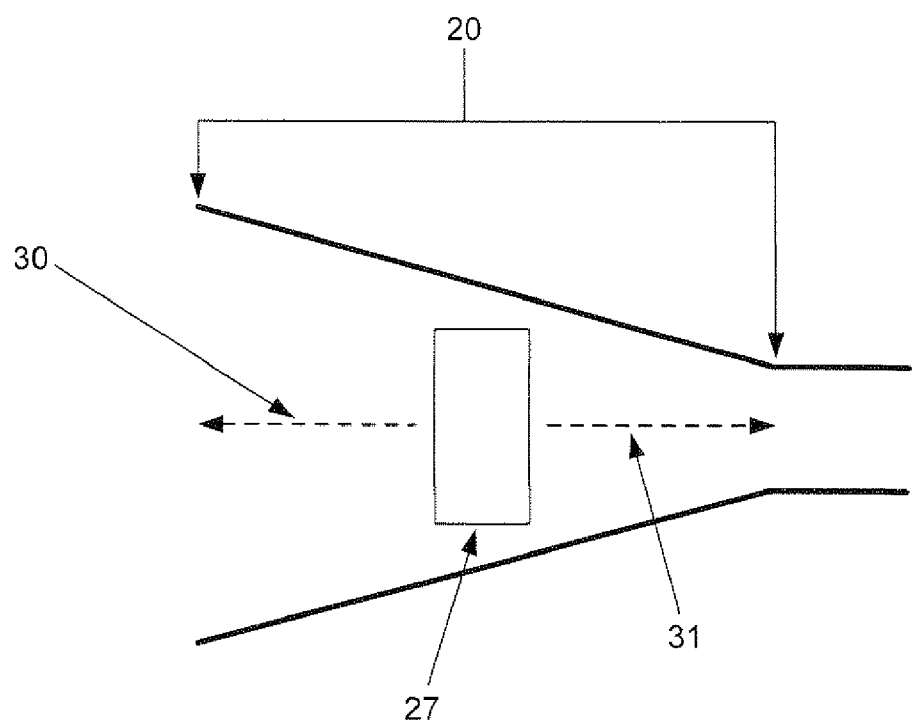
FIG. 3 is cross-sectional view of one embodiment of a turbine in accordance with the present invention illustrating the Venturi area.

As indicated by lines 30 and 31 in FIG. 3, electric generator 27 can be positioned within Venturi area 20 as needed. Ideally, electric generator 27 will be positioned as far forward of the entrance to Venturi area 20 as possible in order to achieve the most benefit of increased fluid speed due to the Venturi effect. However, the location will depend on a number of factors, including the size of the Venturi area and the size of electric generator 27.

Figure 4:
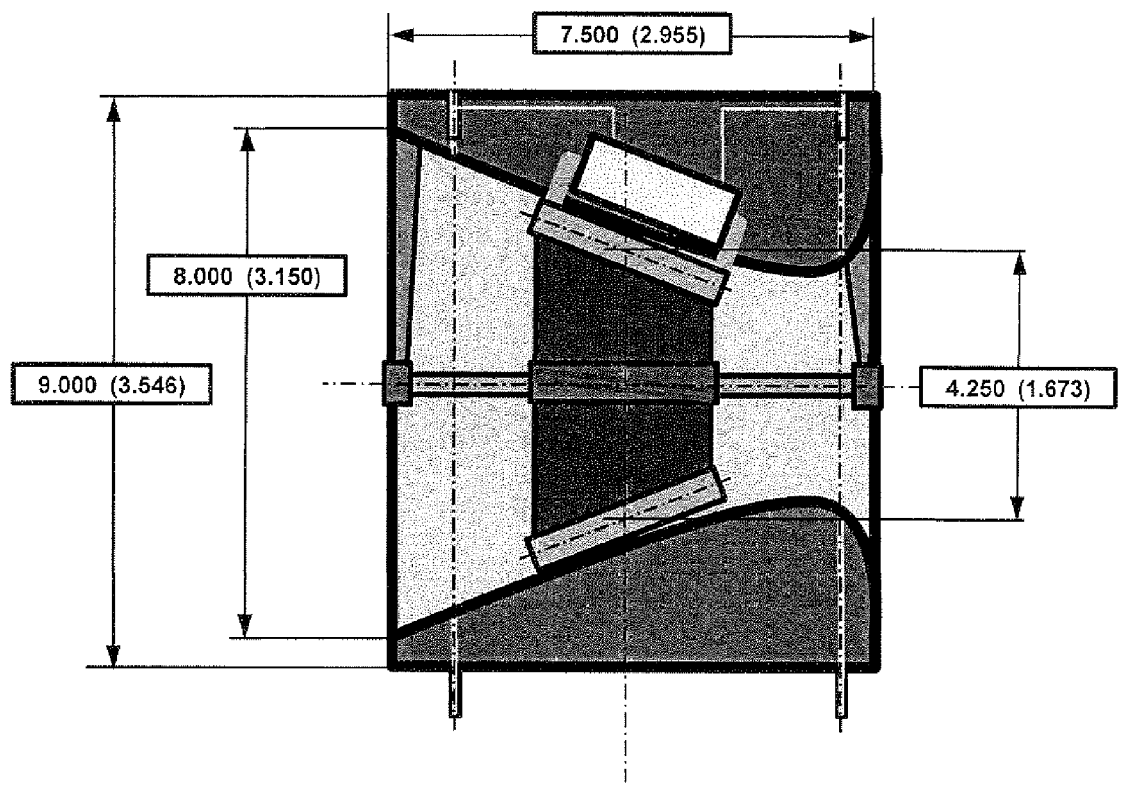
FIGS. 4-5 is a cross-sectional view of one embodiment of a single stage turbine in accordance with the present invention.

FIG. 4 is a cross-section of a more detailed view of one embodiment of a turbine in accordance with the present invention. Dimensional construction details of this proposed single stage, unidirectional micro wind turbine in a parallel electrical configuration are shown in FIG. 4. The dimensions shown in FIG. 4 are target dimensions in cm (in) and given for reference purposes only.

Figure 5:
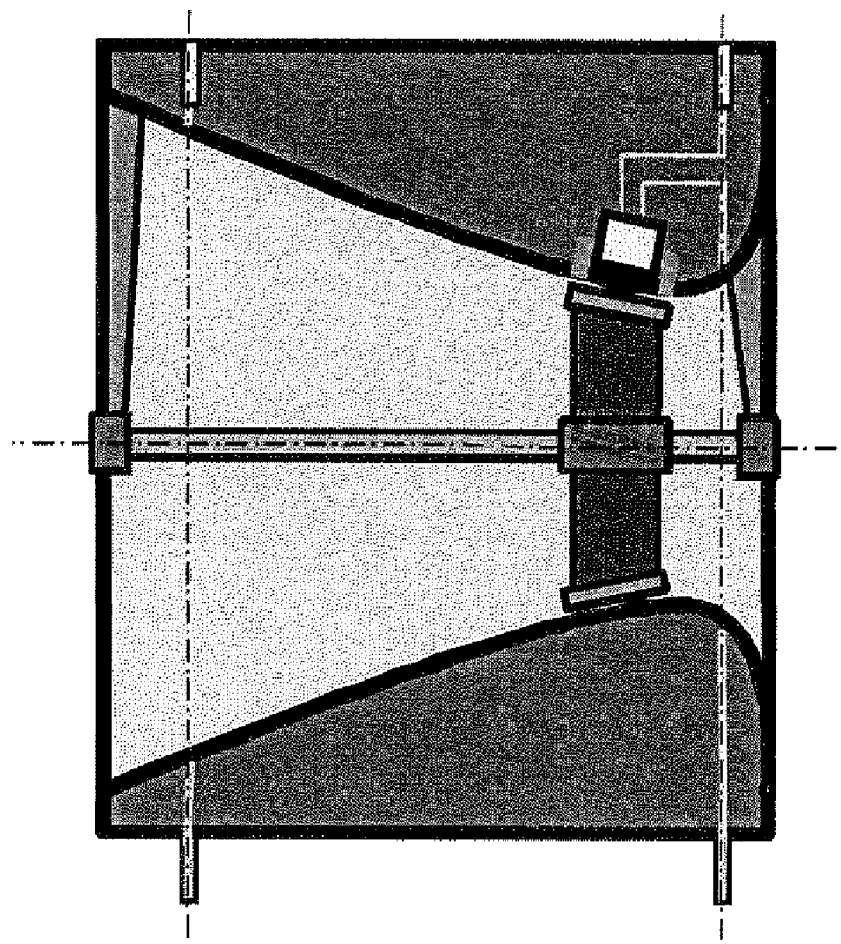

The proposed single stage micro wind turbine may also be constructed in a serial electrical configuration, as shown in FIG. 5.

The concept of the design is to place the single turbine fan stage as close as possible to the constricted zone, or the Venturi area of the turbine. By increasing the length of the turbine, additional fan stages may be added to the design, potentially increasing the electrical power output of the turbine closer to the limits established by Betz' law.

Figure 6:
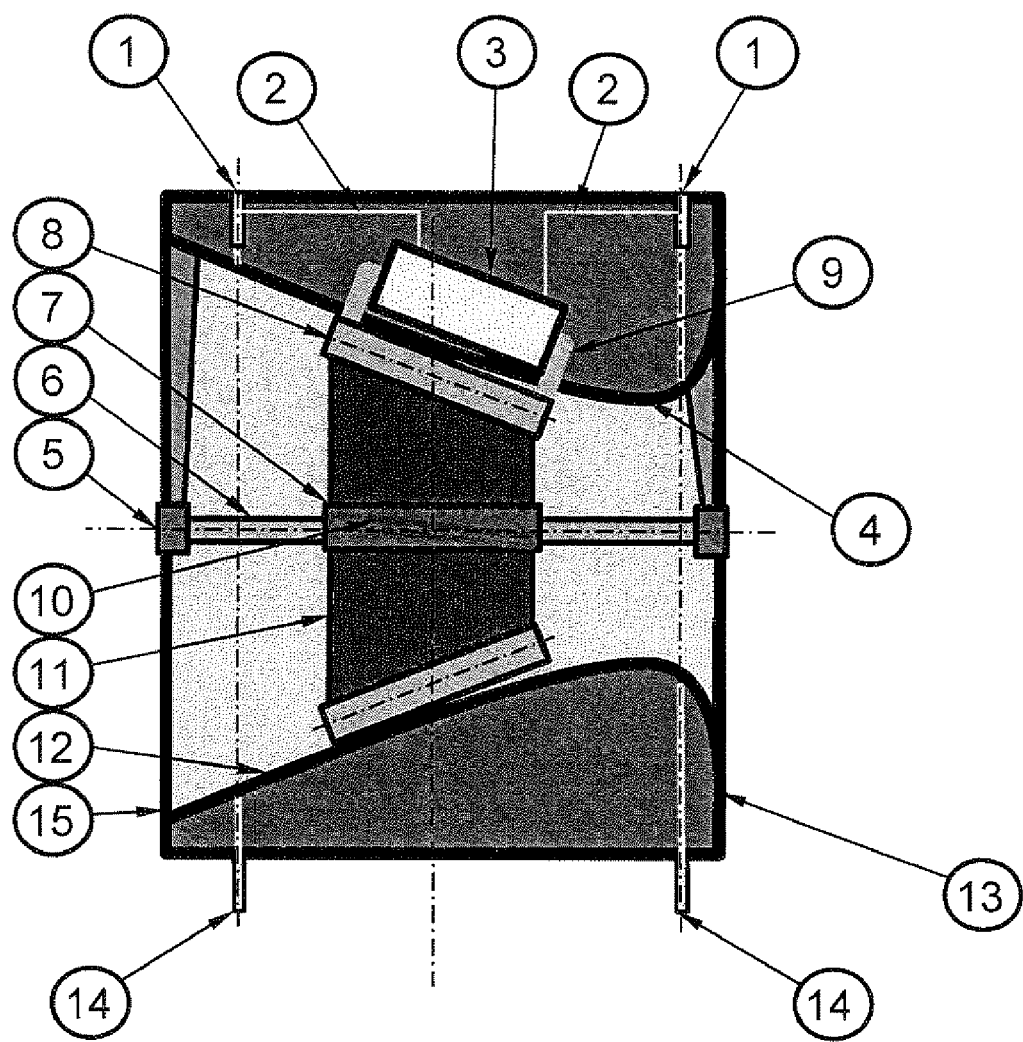
FIG. 6 is a cross-sectional view of a single stage turbine in accordance with the present invention illustrating its various component parts.

FIG. 6 shows additional construction details of the proposed single stage, unidirectional micro wind turbine.

The reference numbers in FIG. 6 refer to:
1) Electrical quick disconnects, aerospace type, self locking, and self lubricating sockets;
2) Embedded electrical connections, in this illustration shown in a parallel configuration. There is also a serial configuration.
3) Electrical coil, or pole, with n tightly wound turns.
4) Micro wind turbine Venturi or constricted area.
5) Extremely rigid stationary axel support structure spaced 120°.
6) Stationary, rigid axel.

7) Precision, self lubricated, precise and high reliability roller bearings, such as used in mass produced, high quality, analog Swiss watches.
8) Permanent magnet, featuring permanent magnetic field, very high density, using neodymium (rare earth) magnets, or equivalent.
9) Ferrite armature coil core, laminated, in order to suppress the formation of Eddy currents, which detrimentally affect the efficiency of the generator.
10) Fixed pitch angle of n single stage turbine fan blades. The fixed pitch angel may be sequentially alternating for multi stage turbine fans.
11) Free rotating, single stage turbine fan with n blades.
12) Highly polished and smooth turbine intake surface. Additionally, the intake may feature vanes for applications in consistently transitional or turbulent wind conditions.
13) Injection molded micro wind turbine body, high impact plastic materials, possibly clear plastic.
14) Electrical quick disconnects aerospace type, self locking, and self lubricating pins.
15) Micro wind turbine intake with smooth leading edge.

Figure 7:
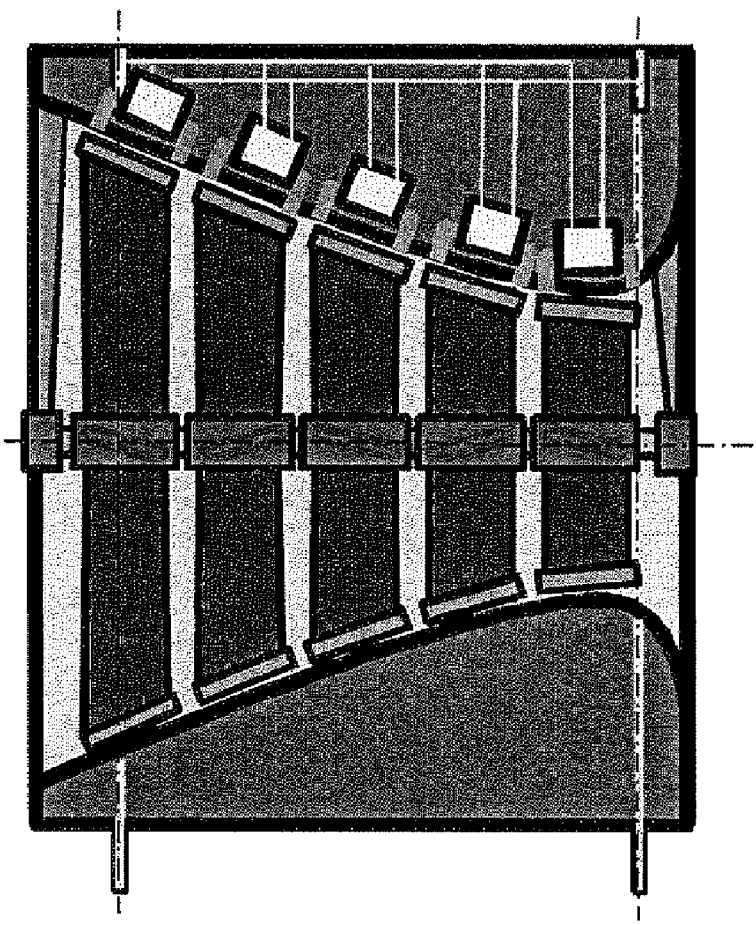
FIG. 7 is a cross-sectional view of one embodiment of a multi-stage unidirectional turbine in a parallel electrical configuration in accordance with the present invention.

FIG. 7 shows a typical layout of a multistage, unidirectional micro wind turbine in parallel electrical configuration in accordance with the present invention. The pitch angles of the multistage turbine blades are alternating, forcing the wind flow to change direction and by doing so, increase the efficiency of the proposed micro turbine.

Figure 8:
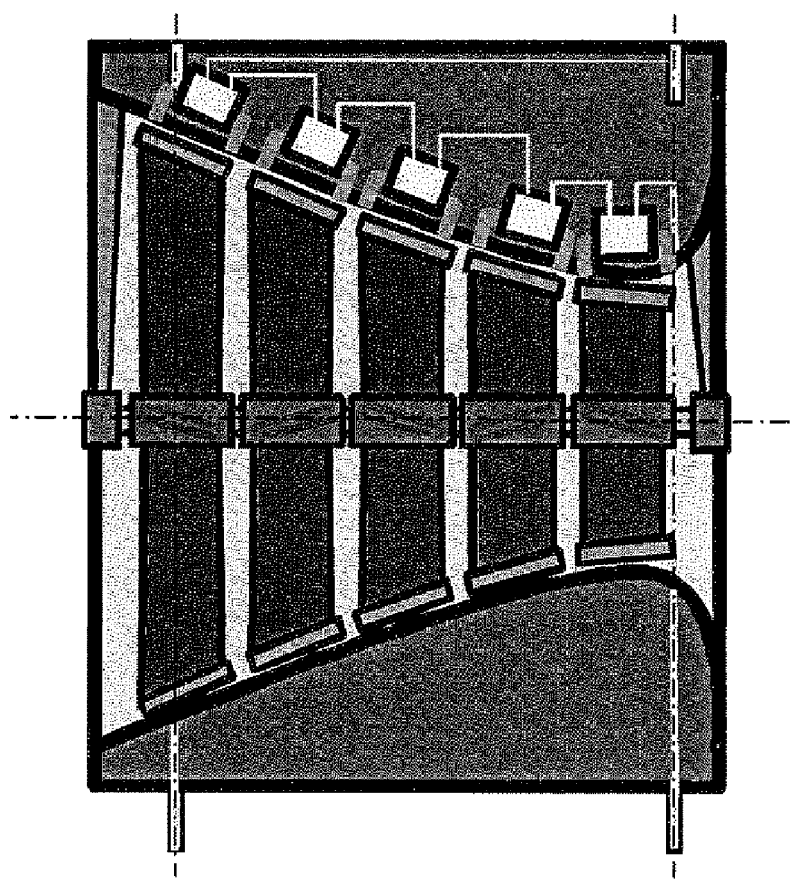
FIG. 8 is a cross-sectional view of one embodiment of a multi-stage unidirectional turbine in a series electrical configuration in accordance with the present invention.

FIG. 8 shows a typical layout of a multistage, unidirectional micro wind turbine in serial electrical configuration in accordance with the present invention.

Figure 9:
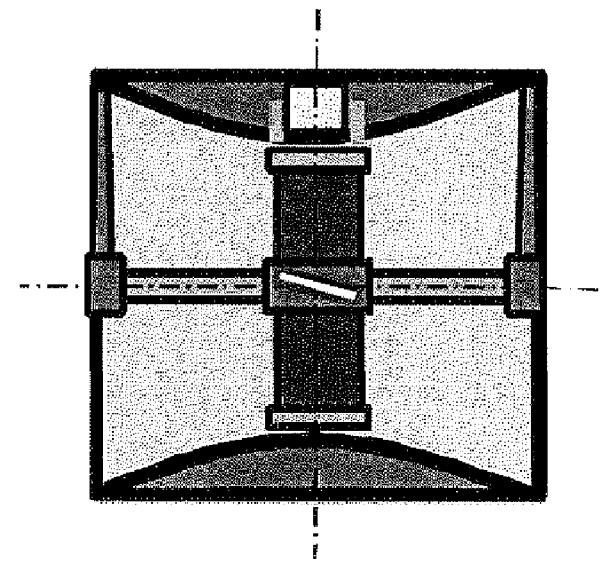
FIG. 9 is a cross-sectional view of one embodiment of a single stage bidirectional turbine in accordance with the present invention.

FIG. 9 shows a typical layout of a single stage, bidirectional micro wind turbine in accordance with the present invention.

Figure 10:
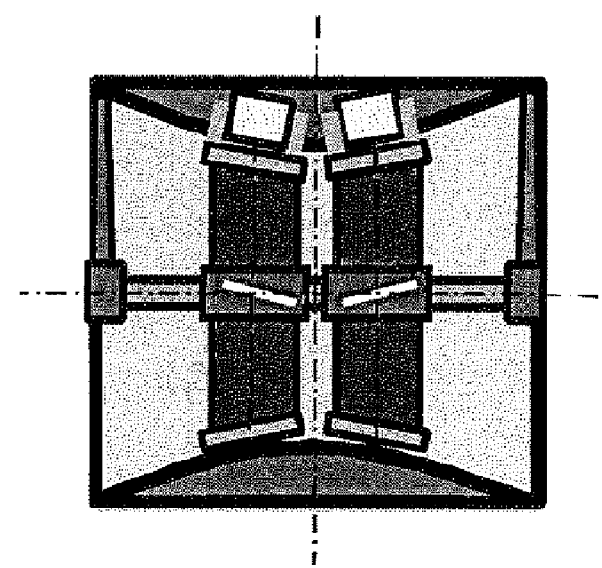
FIG. 10 is a cross-sectional view of one embodiment of a dual stage bidirectional turbine in accordance with the present invention.

FIG. 10 shows a typical layout of a dual stage, bidirectional micro wind turbine in accordance with the present.

In accordance with the present invention, transformation of energy derived from fluid into mechanical energy (wind is used herein as an example only) and then into electrical is optimized by:

a) providing the wind a very smooth, unobstructed flow path through the Venturi, except, of course, for the energy converting obstructions represented by the single or multiple turbine fan stages;

b) optimizing the ratio between intake diameter and Venturi diameter to achieve maximum efficiency of the micro wind turbine, i.e. maximum possible rpm of the free rotating single stage or multistage turbine wheels;

c) optimizing the pitch angle of the single or multiple fan stage blades to achieve an absolute maximum of free rotational speed of the single stage or multistage turbine fan wheels, extracted from the corresponding wind velocities through the Venturi.

Assuming again that a typical horizontal wind turbine with a turbine blade radius of r=0.02125 m, and a very conservative Betz factor of $\alpha$=0.17, is potentially capable of producing 12 watts at a wind velocity of 43 m/s or 96 mph, with a mass density of air at sea level of $\rho$=1.225 kg/m³.

Translating the above into the terms of the turbine of the present invention, the wind velocity of 43 m/s represents the wind velocity in the Venturi, or constricted area of the proposed micro wind turbine.

The wind velocity at the turbine intake which produces a wind velocity of 43 m/s in the Venturi can be determined. The following calculation of wind velocity through the proposed micro wind turbine at different diameters, assumes incompressible flow, based on Bernoulli's principle of conservation of energy, which states $$p_1/\rho + v_1^2/2 + gz_1 = p_2/\rho + v_2^2 + gz_2 + \Delta p_{1\text{-}2}/\rho$$

Where:
$p_1$=Intake pressure (kg/m²)
$\rho$=Mass density of air (kg/m³)
$v_1$=Intake wind velocity (m/s)
g=Gravitational constant (m/s²)
$z_1$=Intake geodetic height (m)
$p_2$=Venturi pressure (kg/m²)
$v_2$=Venturi wind velocity (m/s)
$z_2$=Venturi geodetic height (m)

It is assumed that the proposed micro wind turbine is installed in a horizontal position, resulting in $z_1$=$z_2$, which means that the potential energy factor g z in the equation can be omitted.

It is further assumed that the pressure loss $\Delta p_{1\text{-}2}$ in the proposed micro turbine is very small and can be omitted.

The volumetric flow Q in the proposed micro turbine is $$Q = v_2 d_2^2 \pi / 4$$

Where:
Q=Volumetric flow (m³/s)
$d_2$=Venturi diameter (m)

The volumetric flow Q at a venturi wind velocity of $v_2$=43 m/s and a venturi diameter $d_2$=0.0425 m is 0.061 m³/s.

Since the volumetric flow, as stipulated in Bernoulli's principle, is constant on its path through the proposed micro wind turbine, then $$Q = v_1 d_1^2 \pi / 4$$

Where:
Q=Volumetric flow (m³/s)
$d_1$=Intake diameter (m)

The intake wind velocity $v_1$ can now be solved for the turbine $$v_1 = 4Q/d_1^2 \pi$$

Consequently, the intake wind velocity $v_1$ which corresponds with a venturi wind velocity of $v_2$=43 m/s, is 12 m/s.

Figure 11:
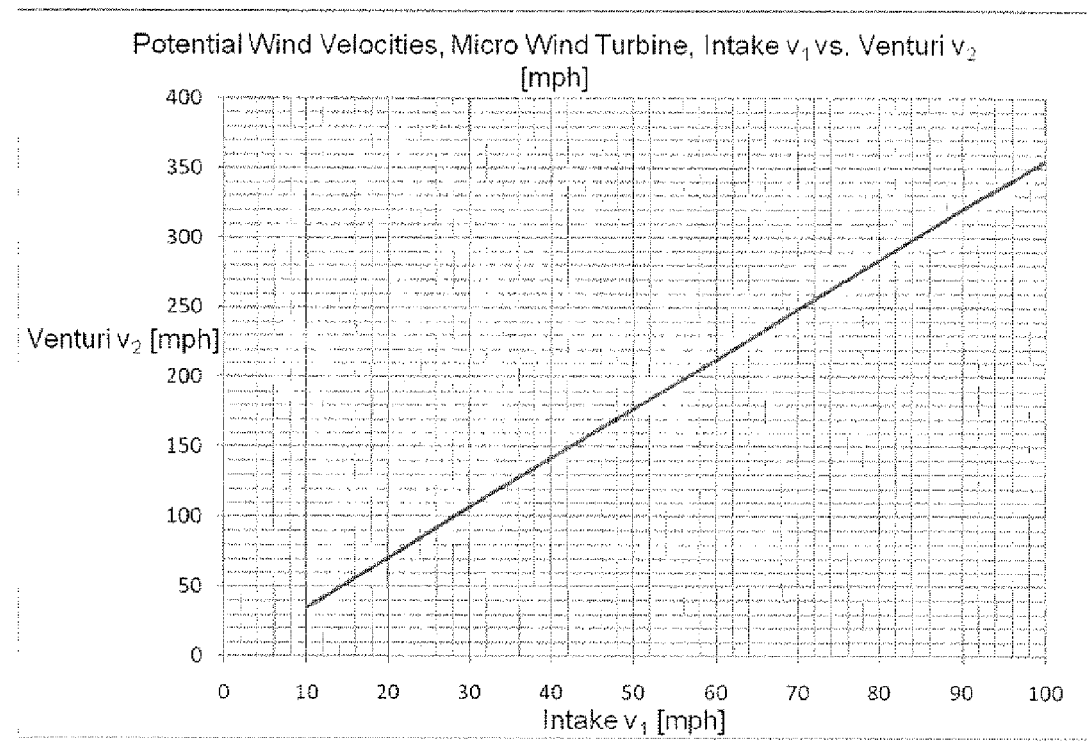
FIG. 11 is a graph of ambient wind velocities present at the intake and in the Venturi area of a turbine in accordance with the present inventions.

FIG. 11 shows a graph of the ambient wind velocities $v_1$ that must be present at the intake for the corresponding wind velocities $v_2$ at the Venturi, or constriction, of the proposed micro wind turbine. The graph shows that for the typical example presented, the turbine of the present invention is operating in the subsonic wind velocity range and that there appears to be ample room to expand until the sonic boundary is reached.

Figure 12:
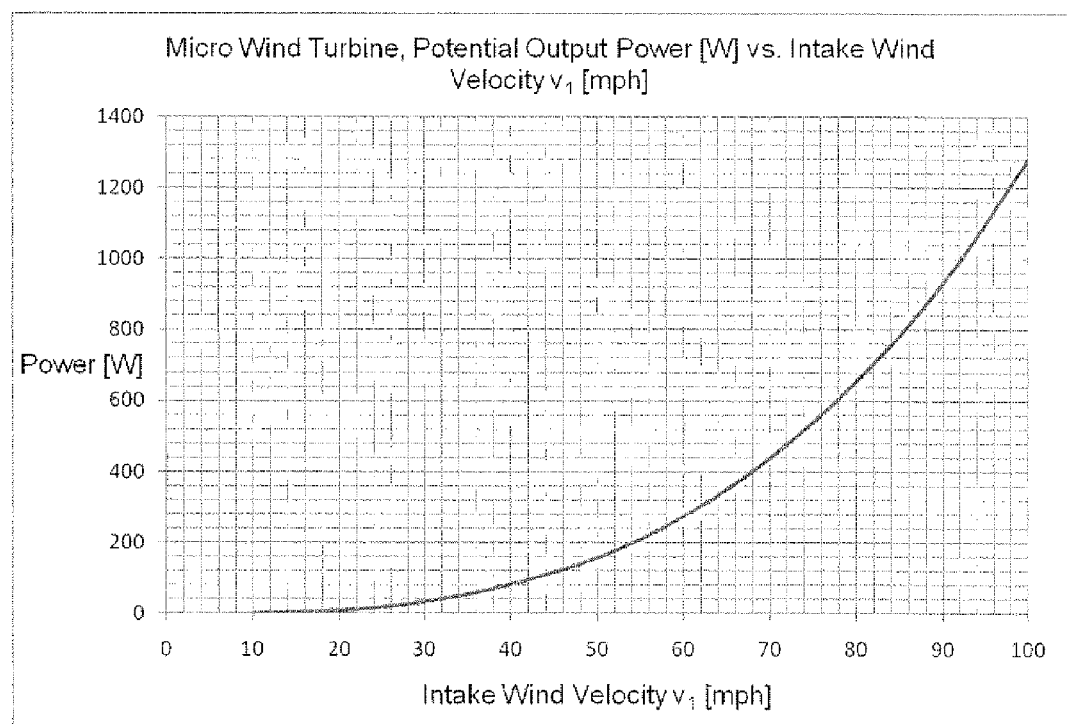
FIG. 12 is a graph of the output power versus intake wind velocity of a turbine in accordance with the present invention.

FIG. 12 shows a graph of the potential output power of the turbine in Watts versus intake wind velocity $v_1$, using a very conservative efficiency factor $\alpha$=0.17, based on Betz' Law, to reflect the very novel design of the proposed micro wind turbine. The graph is based on approximations; however, it subtly suggests the significant magnitude of output power which the proposed micro wind turbine is potentially capable of producing.

The objection of the present invention to efficiently transform mechanical energy into electrical energy in accordance with the present inventions can also be shown by Faraday's law of induction:

a) placing permanent magnets with permanent magnetic fields optimized at maximum density at the tips of the single or multiple fan stages, using neodymium (rare earth) magnets, or equivalents.

b) placing a maximum number of electrical coils, or poles, perfectly aligned with the circular path of the permanent magnets at the tips of the single or multiple fan stages around the circumference of the micro wind turbine;

c) arranging the mechanical alignment of the electrical coils, or poles, in such a fashion that the resulting gap between the rotating permanent magnets and the electrical coils, or poles, is maintained at an absolute minimum, i.e. less than ±0.05 mm (±0.002 in) as a target. The reason for this minimum mechanical gap requirement is the intent to take full advantage of the magnetic field intensity of the rotating permanent magnets and their effect on the electrical coils, or poles, with an optimum number of n windings.

The transformation of mechanical energy into electrical energy is governed by Faraday's law of induction, which states for a tightly wound coil of insulated wire, composed of N identical loops, each exposed to the same magnetic flux $\Phi$, the resulting electromotive force EMF $\epsilon$ for a time interval of $\Delta t$ can be determined as follows:

$$\epsilon = -N\Delta(BA)/\Delta t = -N\Delta\Phi/\Delta t \text{ since } \Phi = BA$$

Where:
$\epsilon$=Electromotive force EMF (V)
$\Phi$=Magnetic flux through a single turn, or loop, of wire in the coil (T m$^2$)
A=Area perpendicular to the magnetic field (m$^2$)
B=Average magnetic field (T)
t=Time (s)
N=Number of turns, or loops, of wire in the coil Assume that the turbine of the present invention freely rotates at a maximum of 5,000 rpm, which corresponds to 83 rotations per second, or rps. The velocity $v_{PM}$ at which the permanent magnets at the ends of the turbine stage blades travel is then $$v_{PM} = 2r\pi \text{rps}$$

Where:
$v_{PM}$=Velocity, permanent magnets (m/s)
r=Radius, turbine blade tip (m)
rps=Rotations per second, turbine blade So, the velocity $v_{PM}$ of the permanent magnets at 5,000 rpm is then 11.1 m/s The permanent magnet with a permanent magnetic field of B=0.100 T, travels through the area A perpendicular to the coil in the time interval $\Delta t$ of $$\Delta t = w/v_{PM}$$

Where:
w=Width of the coil (m)
$v_{PM}$=Velocity, permanent magnets (m/s)

So, for a coil width w=0.01 m and a velocity of $v_{PM}$=11.1 m/s, the time interval $\Delta t$ is 0.000899 seconds, or 899 µs.

It then follows that the magnetic field encompassed in the time interval $\Delta t$ is the differential $$\Delta B/\Delta t$$

which, in a magnetic field of B=0.100 T and at a time interval $\Delta t$=899 µs, is 111 T/s.

Let's now determine the coil area A perpendicular to the magnetic field $$A = ab$$

Where:
A=Area perpendicular to the magnetic field (m$^2$)
a=Length (m)
b=Width (m)

Assuming the length to be a=0.025 m, and the width b=0.01 m, then the resulting area is 0.00025 m$^2$.

It is further assumed that the coil has N=1,500 turns, or windings, which results in a potential EMF $\epsilon$=−41.7 Vdc for time interval $\Delta t$.

Figure 13:
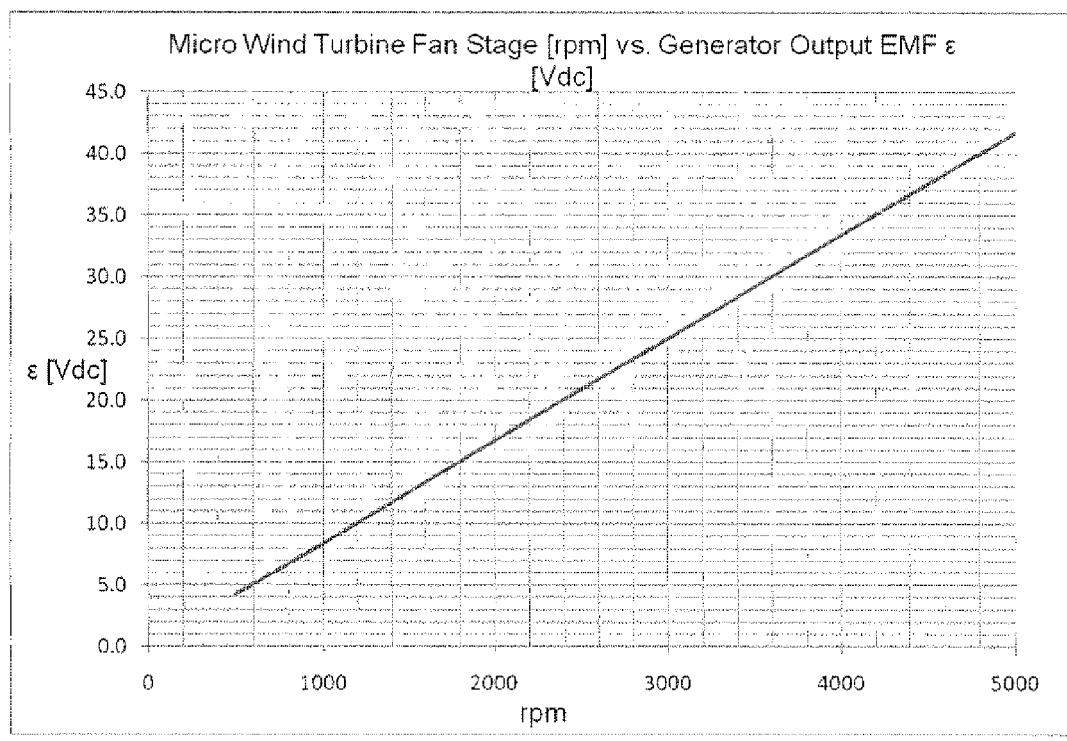
FIG. 13 is a graph of the electromotive force that can be produced by a turbine in accordance with the present invention.

FIG. 13 show a graph of the output electromotive force EMF $\epsilon$ in Vdc that the proposed micro wind turbine is potentially capable of producing at various fan stage rpm, an average magnetic field B=0.1 T and 1,500 wire turns, or windings, per coil, or pole.

It must be understood that the proposed micro wind turbine will not produce an EMF voltage $\epsilon$ that is continuous, such as a DC generator; it will also not produce an AC voltage, such as an AC generator, both for obvious reasons. What it is expected to produce is a continuous sequence of very powerful DC pulses, or spikes, tightly spaced as a function of the number of coils, or poles, and proportional in strength with the rpm of the free rotating turbine stage. The coils may be connected in series, parallel, or any combination of both, depending on the application. The processing of the tightly packed pulses produced by the micro wind turbine is discussed below.

FIGS. 14-17 illustrate a diagram of the electromechanical design of the turbine in accordance with the present invention, including mechanical details regarding the attachment of the permanent magnets to the tip of the fan blades.

The turbine of the present invention allows the user to:

a) convert the electrical energy produced by these modules for direct interface and delivery to an existing, conventional power grid, such as 115 Vac, 60 Hz, or 220 Vac, 50 Hz (Europe), or any other voltage and frequency, using conventional solid state converter technology;

b) store the electrical energy in conventional battery arrangements and then convert the electrically energy stored, if required by the application, to 115 Vac, 60 Hz, or 220 Vac, 50 Hz (Europe), or any other voltage and frequency, on demand, using conventional solid state converter technology;

c) store the electrical energy in Electric Double-Layer Capacitor (EDLC) arrangements and then convert the electrically energy stored, if required by the application, to 115 Vac, 60 Hz, or 220 Vac, 50 Hz (Europe), or any other voltage and frequency, on demand, using conventional solid state converter technology;

d) store the electrical energy in Superconducting Magnetic Energy Storage (SMES) arrangements and then convert the electrically energy stored, if required by the application, to 115 Vac, 60 Hz, or 220 Vac, 50 Hz (Europe), or any other voltage and frequency, on demand, using conventional solid state converter technology; and/or e) convert the stored electrical energy into suitable Vdc levels, using conventional solid state DC/DC converter technology.

As mentioned above, the turbine of the present invention can produce continuous sequences of very powerful DC pulses, or spikes, spaced in time as a function of the number of coils, or poles, and proportional to the rpm of the turbine stage. The coils may be connected in series, parallel, or a combination of both, depending on the application.

Figure 18:
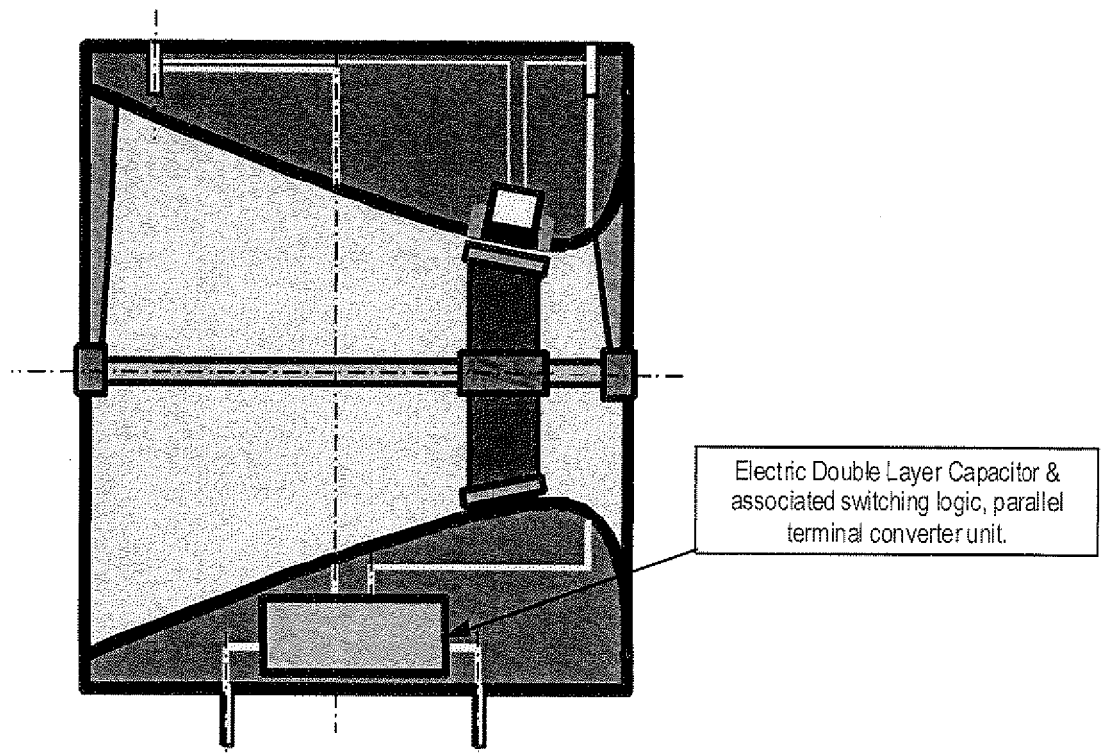
FIG. 18 is a cross-sectional view of one embodiment of a turbine in accordance with the present invention illustrating capacitors as storage units.

FIG. 18 shows the integration of an advanced Electric Double-Layer Capacitor with a potential of 10,000 Farads, integrated in to a terminal type, unidirectional, micro turbine wind generator, parallel electrical configuration. The release of the electrical energy stored in the capacitor is controlled by a conventional process control system, which will also control the solid state converter associated with the application.

Figure 19:
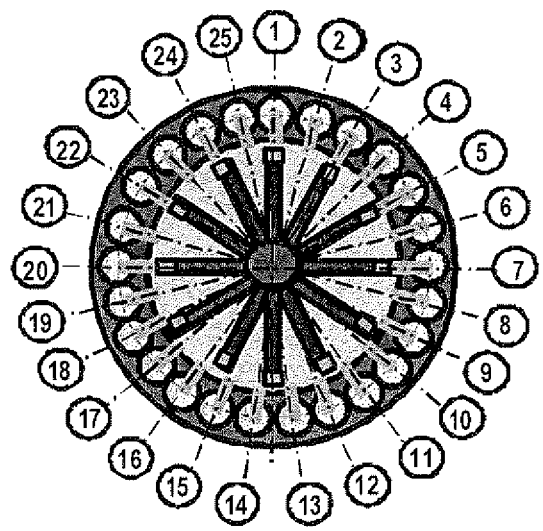
FIG. 19 is cross-sectional view of one embodiment of a turbine in accordance with the present invention illustrating how the electrical coils may be arranged for each fan stage of the turbine.

FIG. 19 shows how the electrical coils, or poles, may typically be arranged mechanically for each fan stage of the proposed micro wind turbine. As many poles as physically possible are placed around the circumference of each fan stage. Further, the number of poles may be odd in order to provide for an even distribution of the DC pulses generated. Reference is made to FIG. 8 for construction details.

The potential current I in a single coil, or pole, circuit can be determined for a specific time interval $\Delta t$, assuming an inductive reactance, capacitive reactance and resistance series circuit, by using the following equations defined by Ohm's Law.

The inductive reactance $X_L$ can either be empirically determined by measuring it, or it can be calculated using the following equation:

$$X_L = 6.283 fL$$

Where:
$X_L$=Inductive reactance ($\Omega$)
$f=\Delta\epsilon/\Delta t$(V/s)
L=Inductance (Henrys)

The inductive capacitance $X_C$ can either be empirically determined by measuring it, or it can be calculated using the following equation:

$$X_C = 0.15915/fC$$

Where:
Xc=Capacitive reactance ($\Omega$)
$f=\Delta\epsilon/\Delta t$(V/s)
C=Capacitance (Farads)

Now, the potential current for time interval $\Delta t$ can be calculated, using the following equation $$I_{COIL} = \epsilon/[R^2+(X_L-X_C)^2]^{1/2}$$

Where:
$\epsilon$=Electromotive force EMF (V)
R=Resistance ($\Omega$)
$X_L$=Inductive reactance ($\Omega$)
$X_C$=Capacitive reactance ($\Omega$)

Once the potential coil current $I_{COIL}$ for the time interval $\Delta t$ is known, then the potential power per coil $P_{COIL}$ can be calculated for time interval $\Delta t$, using the following equation $$P_{COIL} = I_{COIL}\epsilon$$

The proposed turbine of the present invention uses a novel design to generate electrical energy. The advantages of the proposed micro wind turbine include, but are not limited to, the following unique features:

a) The potential power output per micro wind turbine is presently targeted at 12 W, at a rated wind velocity of 12 m/s. The size of the basic module is 1 m$^2$, which doesn't necessarily need to be square; the module can also be rectangular, round, or any other suitable geometrical shape. The basic module contains 100 micro wind turbines, each potentially producing 12 W of electrical energy, which translates into 1,200 W or 1.2 kW per module.

A typical horizontal wind turbine manufactured by GE produces 3,600 kW, or 3.6 MW, at a rated wind velocity of 14 m/s, using three blades with a rotor diameter of 104 m. The published swept area for this particular model is 8,495 m$^2$.

The swept area of 8,495 m$^2$, published by the manufacturer GE, is being used for comparison. Again, the proposed basic turbine module size is 1 m$^2$ and contains 100 micro wind turbines, each potentially producing 12 W, at a rated wind velocity of 12 m/s. This means that we can place 8,495×100=849,500 micro wind turbines in the same area, each potentially producing 12 W of electrical energy, which translates into 849,500×12 W=10,200 W, or 10.2 MW, which is roughly three times the electrical energy produced by the conventional horizontal wind turbine manufactured by GE.

b) The proposed turbine modules do not need to be mounted at an elevated position off the ground, as they inherently handle turbulent wind conditions near ground well due to the turbine design based on Bernoulli's principle. Additionally, performance of the micro wind turbine in severe turbulent conditions can be further optimized by placing vanes in front of the modules. Finally, the modules can be flexibly shaped to follow the topography of the terrain, taking advantage of small canyons, rock chimneys, rocky outcroppings, cliffs, for example.

c) The proposed turbine modules are easy to install and maintain, particularly in a challenging topographical environment. Maintenance will further be enhanced by diagnostic LED indicators installed on each micro wind turbine and on each module. The replacement of a failed micro wind turbine is easy due to its modular design. There are no external cabling harnesses in a micro wind turbine, nor are there any wire harnesses in a module, since all electrical conductors are embedded and molded into the structures of the turbine and the module. Electrical connections, again, are molded and self locking in individual micro wind turbines and modules.

d) The failure of a single or several turbines will not affect the performance of the micro wind turbine farm. The remaining turbines in the farm will continue to operate and produce electrical energy.

e) The proposed turbine does not need an overspeed cut-out feature due to high wind velocities, as the size and mass of its turbine fan stages do not develop the centrifugal forces required to create catastrophic failures. The free rotating turbine fan stages will be precisely balanced to allow continuous operation in wind speeds approaching the sonic boundary.

f) The target cut-in wind velocity of the proposed turbine is expected to be less than 0.1 m/s.

g) The proposed turbine does not detrimentally interfere with the operations of radar installations found near commercial and military airports.

h) The proposed turbine does not pose a danger to migrating birds due to its very small size.

i) The proposed turbine is environmentally friendly; most of its components can be constructed using clear, high impact plastics, employing injection molding technology. The proposed turbine can not be easily seen.

j) The proposed turbine is expected to be quiet, as its free rotating fan stages are precisely balanced.

k) Turbines for operations in freezing environments can be made featuring anti-icing provisions, which will be pulsating at a frequency proportional to ambient temperature and ambient relative percentage humidity. The anti-icing option will heat the leading edge of the air intake in very short intervals, using electrical energy generated by the modules. The efficiency of the modules will be reduced by the anti-icing feature directly proportional to ambient temperature and ambient relative percentage humidity.

j) The proposed turbine does not feature a stator with electromagnetic coils, it also does not feature the single or multiple fan stages mechanically coupled with a rotor with individual coil windings, commutator and brushes or slip rings.

l) The proposed wind turbine is a simple, very basic, highly efficient, unique and yes, very elegant little machine for which the time has come.

As pointed out above, the turbine of the present invention has application to many sources of energy where the energy is in the form of a moving fluid or a fluid that is stationary and impedes movement.

An example of use of the turbine for a fluid at rest is an environment where the turbine is mounted on a moving vehicle and is used to generate electrical power to operate the vehicle or to operate other equipment on the vehicle. In this environment, the fan blade in the turbine is forced through the essentially still air as the vehicle moves. The moving vehicle causes the blade within the turbine to hit the still air, resulting in blade rotation. In this environment, it is the blade that is moving relative to the air rather than the air which would be the case in a traditional wind mill environment.

The turbine of the present inventions may also be driven by virtually any fluid, including air, water and other liquids at rest (as explained above with respect to a vehicle) or in motion. Thus, the turbine of the invention may be mounted in an air duck in a building and be driven by the air flow within the duck. The turbine may also be installed in water lines and operated accordingly. Accordingly, the turbine may be used to provide supplemental electrical power to the building or to power the building altogether.

Because the turbine of the invention produces a voltage that corresponds to the speed of the driving fluid, or the speed of the turbine in relation to the fluid, the turbine may also be used to measure fluid speed or turbine speed. Thus, the turbine can be used as a flow speed meter.

Figure 20:
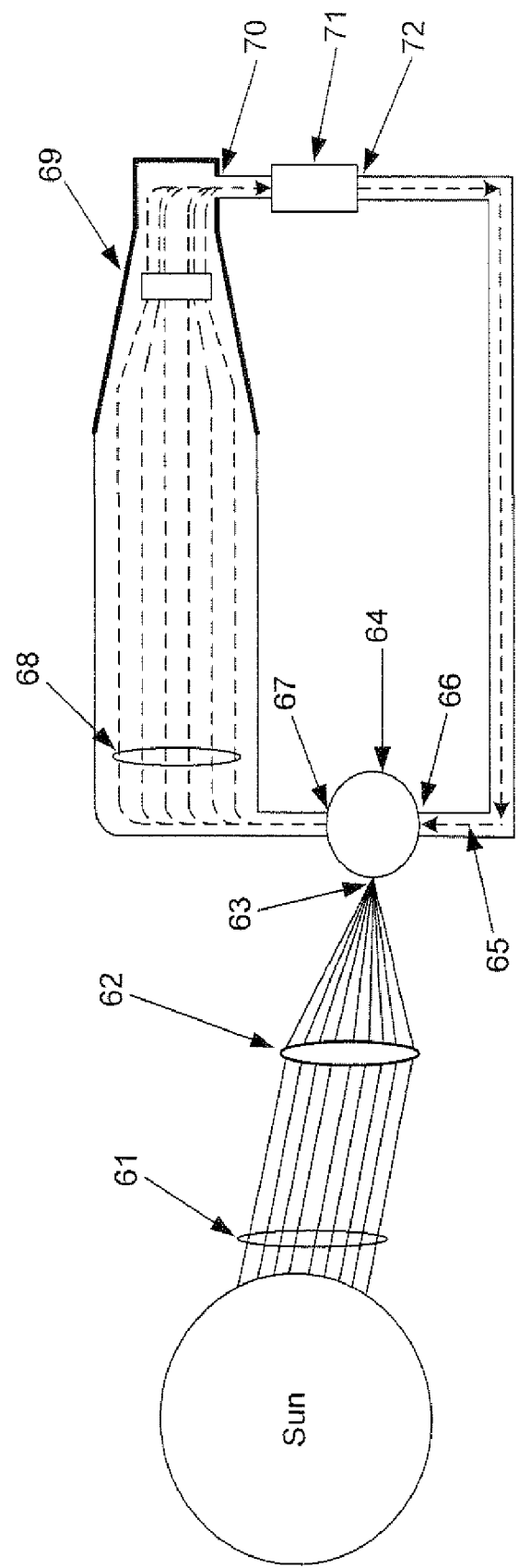
FIG. 20 is mechanical illustration of one embodiment of a turbine in accordance with the present invention used to convert solar energy into electrical energy.

FIG. 20 illustrates a further application of the fluid turbine of the present invention. In this application, the radiant energy of the sun is converted to electrical energy by the turbine.

As shown in FIG. 20, radiant energy 61 from the sun is concentrated and focused by lens 62 as one of ordinary skill in the art would understand. Lens 62 focuses the radiant energy into an extremely narrow and hot concentration of energy at point 63. The concentrated energy is then used to heat water contained in vessel 64 to the vaporization point.

Figures 14, 15, 16, 17:
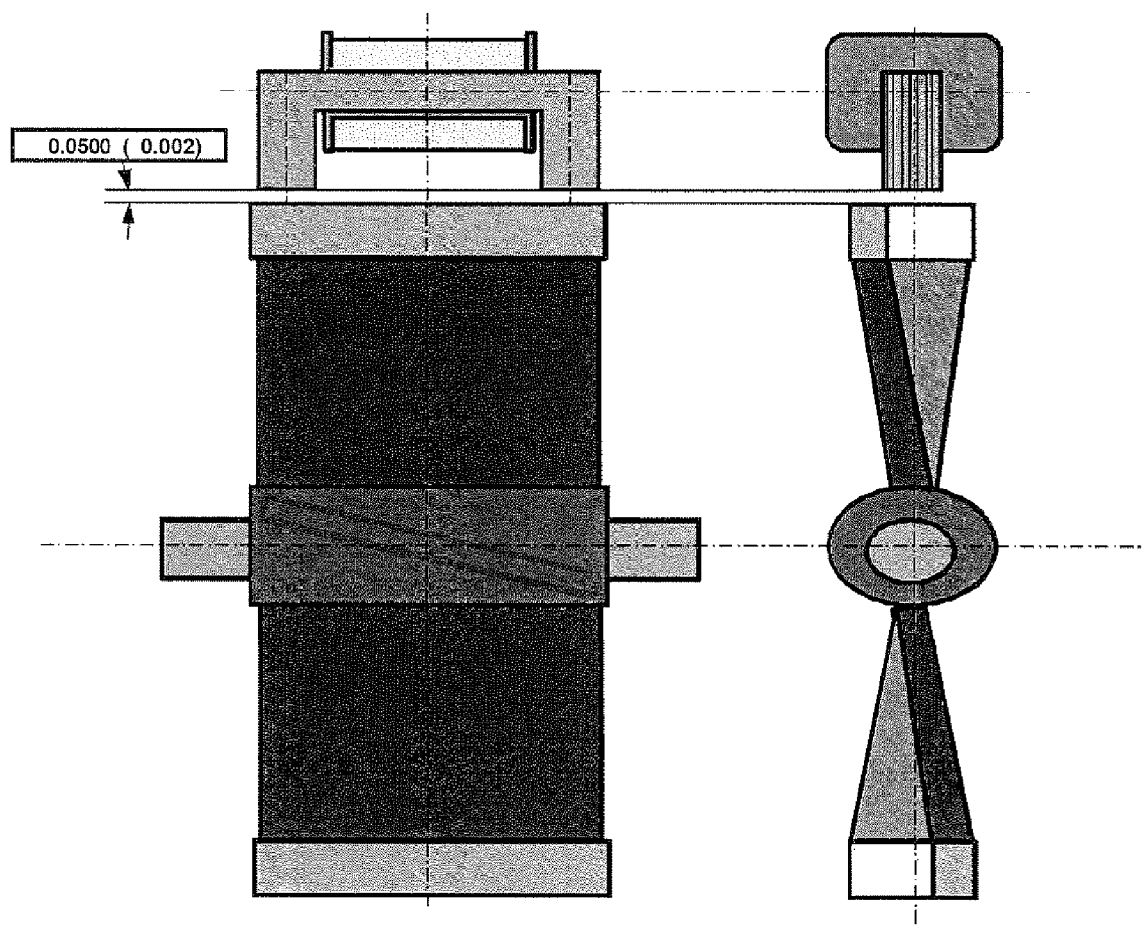
FIGS. 14-17 are cross-sectional views of one embodiment of a turbine in accordance with the present invention showing attachment of permanent magnets to the tip of the fan blades.

Water, as indicated by reference number 65 in FIG. 17, enters vessel 64 through inlet port 66 and the vaporized water exits vessel 64 at outlet 67 in the form of steam 68. Steam 68 is then used to drive turbine 69 in accordance with the present invention.

Steam 68 then exits turbine 69 at outlet 70 and enters cooling station 71. Cooling station 71 cools the steam sufficiently that it is converted back to water. The water is discharged from cooling station 71 at outlet 72 and circulated back to inlet 66 of vessel 64 in a continuous loop.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A wind turbine for converting wind energy into electrical energy, said wind turbine comprising:
    a conduit having an inlet for receiving wind energy into said conduit and an outlet for the wind energy;
    a blade rotatably mounted within said conduit and being rotated by the wind energy as it passes through said conduit;
    a magnet coupled to said blade and integrally formed with said blade;
    a coil positioned about said conduit in a voltage inducing relationship with said magnet during the rotation of said blade, wherein a voltage is induced in said coil allowing an electric current to flow in said coil when the field of said magnet passes said coil; and
    an output device coupled to said coil for transferring said electrical energy to an external device.

2. The wind turbine of claim 1, wherein said conduit diminishing in size between said inlet and said outlet.

3. The wind turbine of claim 1, wherein said inlet has a leading edge through which the wind energy enters said conduit, the surface of said leading edge being substantially smooth so as to minimize disturbances to said wind energy as it enters said conduit.

4. The wind turbine of claim 1, further including a plurality of said blades rotatably mounted within said conduit.

5. The wind turbine of claim 4, further including a plurality of said magnets coupled to respective ones of said blades.

6. The wind turbine of claim 1, wherein said magnet is integrally formed with said blade.

7. The wind turbine of claim 1, wherein said magnet is a permanent magnet.

8. The wind turbine of claim 1, wherein a plurality of said magnets are coupled to said blade.

9. The wind turbine of claim 1, wherein a plurality of said coils are positioned about said conduit in an electrical current inducing relationship with said magnet during the rotation of said blade.

10. The wind turbine of claim 9, wherein at least one of said magnets is an electromagnet.

11. The wind turbine of claim 1, wherein said coil is formed around a laminated core.

12. The wind turbine of claim 1, further including a plurality of said coils.

13. The wind turbine of claim 12, wherein said output device includes a switching device for electrically connecting selected ones of said plurality of coils in parallel and/or in series.

14. The wind turbine of claim 12, wherein said output device includes a switching device for electrically connecting selected ones of said plurality of coils in series/parallel combinations.

15. The wind turbine of claim 1, wherein said blade is mounted within said conduit at a predetermined pitch relative to the flow direction of the wind energy.

16. The wind turbine of claim 15, wherein said pitch is fixed.

17. The wind turbine of claim 15, wherein said pitch is variable.

18. The wind turbine of claim 1, wherein said output device includes an electrical capacitor for storing said electrical energy.

19. The wind turbine of claim 1, wherein said output device includes a superconducting magnetic energy storing device for storing said electrical energy.

* * * * *